United States Patent [19]
Nelson et al.

[11] Patent Number: 6,040,728
[45] Date of Patent: Mar. 21, 2000

[54] ACTIVE SUBSTRATE NOISE INJECTION CANCELLATION

[75] Inventors: Dale H. Nelson, Shillington; Iconomos A. Koullias, Reading, both of Pa.

[73] Assignee: Lucent Technologies, Inc., Murray Hill, N.J.

[21] Appl. No.: 09/086,842

[22] Filed: May 29, 1998

[51] Int. Cl.[7] .................................................. H03K 5/00
[52] U.S. Cl. ........................ 327/292; 311/319; 311/565; 311/552
[58] Field of Search ..................................... 327/311, 551, 327/552, 564, 565, 317, 309, 310, 292, 319

[56] References Cited

U.S. PATENT DOCUMENTS 5,841,308  11/1998  Nagata ................................ 327/307

Primary Examiner—Dinh T. Le
Attorney, Agent, or Firm—Duane Morris & Heckscher LLP

[57] ABSTRACT

An integrated circuit formed within a substrate has a first circuit section and an active noise cancellation section located at least between the first circuit section and a noise source. The active noise cancellation section is coupled to the substrate and injects counter-charge into the substrate to isolate the first circuit section from noise produced by the noise source.

12 Claims, 1 Drawing Sheet 15 6,040,728

ACTIVE SUBSTRATE NOISE INJECTION CANCELLATION

BACKGROUND OF THE INVENTION

1. Field of the Invention

The present invention relates to isolation of sensitive circuitry from noisy circuitry and, in particular, to isolation of digital circuit sections having noise from sensitive analog circuit sections within the same integrated circuit.

2. Description of the Related Art

Noise is problem that manifests itself in a variety of ways. One manifestation occurs when a circuit or circuit section produces noise that can adversely interfere with neighboring circuits. The neighboring circuits may be of different types, and may be mounted in a common housing or substrate. For example, so-called "mixed signal" integrated circuits can provide more than one type of circuit in various areas on a common substrate. The term integrated circuit (IC) may be used in this specification to refer to the actual physical substrate itself as well as the circuits formed therein.

The above-mentioned problem can be particularly acute in ICs having both sensitive analog sections and digital circuit sections. For example, an IC having RF (radio frequency) components may contain both a digital signal processing portion as well as an analog RF receiver portion, which may be configured to receive unbalanced analog signals in the microvolt range. The digital portion generates high frequencies and harmonics and other noise due, in part, to the sharp edges of the digital waveforms used for clock signals and the like. This digital noise can be communicated to the sensitive analog RF receiver portion through the common substrate and can adversely affect the operation of the RF receiver. These adverse effects are exacerbated when the input analog signals are unbalanced rather than balanced. Such noise or related types of noise are sometimes referred to as cross-coupling or cross-talk.

Various techniques have been proposed and utilized to attempt to isolate noisy digital circuit sections from sensitive analog circuit sections within the same IC. Such techniques include isolation by physical separation; isolation by separate supply rails; isolation by grounded guard rings/substrate trenches; differential circuitry in the sensitive analog portion; use of low noise injecting digital circuitry, such as differential logic cells (emitter coupled logic style); and making the digital circuitry portions synchronous with the analog function and moving the clock edges away from critical analog sampling instances.

Such conventional techniques, however, are not always sufficient or fully effective, or practical, feasible, or cost-effective to implement.

SUMMARY

In the present invention, an integrated circuit formed within a substrate comprises a first circuit section, and an active noise cancellation section located at least between the first circuit section and a noise source. The active noise cancellation section is coupled to the substrate and injects counter-charge into the substrate in response to noise from the noise source to isolate the first circuit section from the noise.

DESCRIPTION OF THE PREFERRED EMBODIMENT

Figure 1:
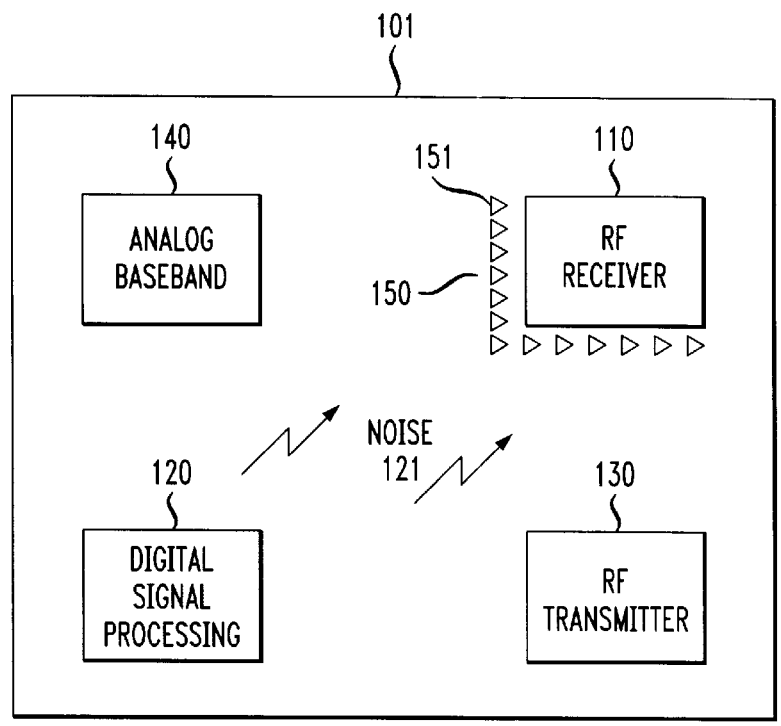
FIG. 1 is a block diagram of an integrated circuit (IC) having exemplary circuit sections and an active substrate noise injection cancellation section, in accordance with an embodiment of the present invention.

The present invention addresses the aforementioned problems by providing for active substrate noise injection cancellation, as opposed to the passive methods of the prior art, as described in further detail below. Referring now to FIG. 1, there is illustrated an IC 100 having exemplary circuit sections or portions 110, 120, 130, and 140 and active substrate noise injection cancellation section 150, in accordance with an embodiment of the present invention.

IC 100 comprises RF receiver section 110, RF transmitter section 130, analog baseband section 140, and digital signal processing section 120, each of which are formed within substrate 101. The components of IC 100 may be used in an RF device such as a cellular telephone which sends and receives electromagnetic signals. RF receiver 110 receives unbalanced analog signals, for example from an antenna, which signals may be in the microvolt range. Baseband processing of received RF signals (for example, carrier channel demodulation) is performed by analog baseband section 140. RF transmitter 130 transmits outgoing signals. Digital signal processing section 120 contains various types of digital circuitry for processing the digital information carried by the analog signal received.

As will be appreciated, the primary mixed signal noise problem in such a system arises in noise 121 generated from digital section 120, which can adversely affect the operation of the sensitive analog RF receiver section 110, since this receives very small signals, typically in the microvolt range. Noise 121 is typically "injected" into substrate 101 and carried via substrate 101 to other circuit sections on IC 100. Digital section 120 is thus a noise source. RF transmitter 130 is high-powered and deals with larger analog signals that are less prone to interference from noise 121. Analog baseband section 140 is also not as prone to being adversely affected by noise 121 because the signals it processes are typically at least in the millivolt, rather than microvolt, range. Thus, in the present invention, IC 100 further comprises active substrate noise injection cancellation section 150. Noise cancellation section 150 is designed to provide a "quiet" region (i.e., a region comparatively isolated from noise 121). In the illustrative embodiment of FIG. 1, the area occupied by RF receiver 110 is a "quiet receiver" region, since noise cancellation section 150 cancels noise 121 emanating through substrate 101 from digital section 120 before it reaches the quiet receiver region of RF receiver 110.

In one embodiment, the noise injection cancellation section 150 comprises an array or bank of active noise injection cancellation circuits, such as active noise cancellation circuit 151, on the borders of RF receiver 110 that face digital section 120. Thus, unlike previous techniques designed to prevent noise from one circuit section from affecting a more sensitive circuit section, noise cancellation section 150 comprises an array of active devices configured so as to cancel out noise injected into substrate 101 by digital section 120, so as to provide the aforementioned quiet region. In this manner, RF receiver 110 resides in a quiet receiver region and thus is less affected by noise 121 than would be the case were noise cancellation section 150 not present or active.

In one embodiment, noise cancellation section 150 comprises a plurality of identically-configured op amp-based noise cancellation circuits. The number of such individual noise cancellation circuits utilized as well as spacing and layout are preferably empirically determined on a case by case basis. In one embodiment, the area of the portion of substrate 101 illustrated in FIG. 1 is approximately 25 mm$^2$; the area of RF receiver section 110 is approximately 4 mm$^2$; and noise cancellation section 150 comprises approximately 50 individual noise cancellation circuits, more or less evenly spaced and divided proportionately along the left and bottom sides of RF receiver section 110.

Figure 2:
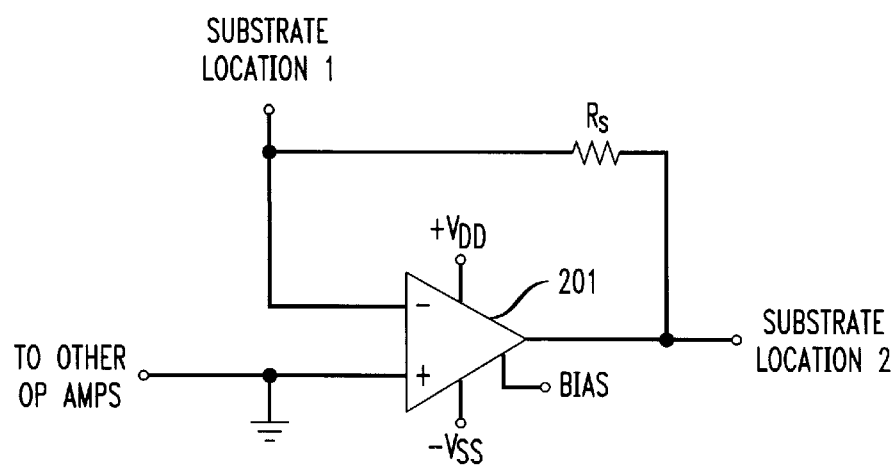
FIG. 2 is a circuit diagram of an operational amplifier (op amp)-based noise cancellation circuit of the IC of FIG. 1.

Referring now to FIG. 2, there is shown a circuit diagram of op amp-based noise cancellation circuit 151 of noise cancellation section 150, in accordance with an embodiment of the present invention. Circuit 151 comprises op amp 201, which has positive and negative differential input terminals, an output terminal, positive and negative (or ground) power supply rails or terminals, and a bias terminal. The positive and negative power supply rails are preferably coupled to $+V_{DD}$ and $-V_{ss}$ power supplies, respectively, which may be, for example, +3 V and 0 V, respectively. The bias terminal is coupled to a bias signal that controls the maximum current output of op amp 201. The bias may be set by empirical testing, but the lower the bias, the smaller maximum noise signal 121 that can be canceled by op amp 201.

The positive differential input terminal is coupled to a reference ground, to which all other op amps of noise cancellation section 150 are coupled by their positive input terminals. The quiet reference ground is an ideal quiet ground potential, which the output of circuit 151 attempts to maintain in the local region of the substrate in which circuit 151 is situated. As will be appreciated, if the potential of the substrate in the "real estate" occupied by noise cancellation section 150 were never to deviate from the reference ground, it would be very difficult for noise 121 to be communicated to RF receiver section 110.

The negative differential input terminal of op amp 201 is directly coupled into the substrate, at a first physical location (location 1). The output terminal of op amp 201 is also directly coupled to the substrate at a second physical location (location), which is relatively close to location 1 but separated by some distance determined by the physical layout of circuit 151. Since there is some substrate in a current path between locations 1 and 2, there is a substrate resistance $R_s$ between the negative input and output terminals of op amp 201.

Thus, as will be understood by those skilled in the art, any deviation from the reference ground at location 1 (due, for example, to noise 121) will be counteracted by current injected by op amp 201 at location 2, which by negative feedback tends to defeat any change in the potential at location 1, and thus in the substrate in the general vicinity of locations 1 and 2, i.e. in the general region occupied by circuit 151. Noise 121 traveling toward RF receiver section 110 is thus at least substantially blocked by the operation of the active devices of noise cancellation section 150. Therefore, op amp 201 is configured to monitor the potential present in the substrate and whether it is deviating from the reference ground, and to inject counter-charge into the substrate to prevent any such deviation. Noise cancellation section 150, which contains a plurality or bank of such active (e.g., op amp-based) noise suppression circuits, provides an active means for isolating one circuit section from noise produced by another.

As opposed to passive techniques, the active noise suppression technique described herein requires some consumption of power. However, this extra cost may be worth paying in various applications where additional noise suppression is important.

In one embodiment, as illustrated in FIG. 1, RF receiver 110 and digital section 120 are placed comparatively far apart on IC 100, preferably on opposing corners. Those skilled in the art will appreciate that the active noise cancellation technique of the present invention may be combined with one or more conventional systems to provide further isolation between RF receiver section and noise-producing digital sections. For example, the present active noise cancellation section may be combined with the use of low noise injecting digital circuitry, or with other conventional techniques, such as described above.

In alternative embodiments, different noise cancellation section layouts may be utilized. For example, all sides of RF receiver section 110, rather than only the two sides facing digital section 120, may be surrounded by noise cancellation circuits. Alternatively, a two- (or multi-) layered noise cancellation section may be employed, for example having two parallel columns and two parallel rows of noise cancellation circuits at the left and bottom sides of RF receiver section 110, respectively. In such an alternative embodiment, the layers may be parallel but within the same plane. Alternatively, parallel layers may lie within different planes of the substrate, e.g. one column may be vertically above the other. In yet another alternative embodiment, some or all of the noise cancellation section may be located beneath or above (or both) the RF receiver section. For example, a planar noise cancellation section having a two-dimensional array (rather than simply rows and columns) of noise cancellation circuits may be formed beneath or above the RF receiver section.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In an integrated circuit formed within a substrate, an array of noise cancellation circuits located at a first location of the substrate for blocking noise generated within the substrate from a noise source located at a second location, wherein each noise cancellation circuit comprises:

(a) a first input terminal coupled to a reference ground;

(b) a second input terminal coupled to the substrate and an output terminal coupled to the substrate, wherein the noise cancellation circuit injects current into the substrate so as to prevent a substrate potential at the first location from changing.

2. The array of claim 1, wherein the first location is between a circuit section sensitive to noise and the second location, wherein the array is for blocking the noise by preventing the substrate potential at the first location from changing to isolate the circuit section from the noise.

3. The array of claim 2, wherein the circuit section is an analog circuit section which is sensitive to noise produced by said noise source.

4. The array of claim 3, wherein the analog circuit section is an analog radio frequency (RF) receiver section.

5. The array of claim 3, wherein the noise source is a digital circuit section of the integrated circuit.

6. The array of claim 5, wherein the analog circuit section is an analog RF receiver section for receiving unbalanced analog signals, the integrated circuit further comprising:

an RF transmitter section; and an analog baseband section for performing carrier channel demodulation on the unbalanced analog signals received by the analog RF receiver section, wherein the digital circuit section is a digital signal processing section.

7. The array of claim 6, wherein:

the substrate on which the analog RF receiver section, the RF transmitter section, the active noise cancellation section, the digital signal processing section, and the analog baseband section are mounted is substantially rectangular in shape; and the analog RF receiver section and the digital signal processing section are located in opposing corners of the substrate.

8. The array of claim 1, wherein the array comprises only one-dimensional arrays of noise cancellation circuits.

9. The array of claim 1, wherein the array comprises parallel arrays of noise cancellation circuits lying in different planes of the substrate.

10. The array of claim 1, wherein the array comprises a two-dimensional planar array section located at the first location which is beneath or above a circuit section sensitive to noise.

11. The array of claim 1, wherein:

each noise cancellation circuit comprises an operational amplifier (op amp); and for each noise cancellation circuit, the first input terminal is a positive input differential terminal of the op amp, the second input terminal is a negative input differential terminal of the op amp, the negative input differential terminal is coupled to the substrate at a first local location local to the noise cancellation circuit and the output terminal amp is coupled to a second local location relatively close to the first local location, wherein a current path between the first and second local locations has a substrate resistance.

12. The array of claim 11, wherein each noise cancellation circuit is located in a respective local location of the substrate within the first location and is adapted to monitor whether the substrate potential at the local location of each said noise cancellation circuit is deviating from the reference ground and to inject said current into the substrate at the local location of the noise cancellation circuit to maintain the substrate potential at the local location of the op amp at the reference ground.

* * * * *